United States Patent
Ahn et al.

(10) Patent No.: US 10,305,585 B2
(45) Date of Patent: May 28, 2019

(54) COMMUNICATION METHOD AND DEVICE IN UNLICENSED BAND

(71) Applicant: LG ELECTRONICS INC., Seoul (KR)

(72) Inventors: Joonkui Ahn, Seoul (KR); Byounghoon Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 15/516,006

(22) PCT Filed: Oct. 7, 2015

(86) PCT No.: PCT/KR2015/010629
§ 371 (c)(1),
(2) Date: Mar. 30, 2017

(87) PCT Pub. No.: WO2016/056849
PCT Pub. Date: Apr. 14, 2016

(65) Prior Publication Data
US 2017/0294958 A1    Oct. 12, 2017

Related U.S. Application Data

(60) Provisional application No. 62/060,579, filed on Oct. 7, 2014.

(51) Int. Cl.
*H04B 1/00* (2006.01)
*H04B 7/26* (2006.01)
(Continued)

(52) U.S. Cl.
CPC .......... *H04B 7/2634* (2013.01); *H04B 1/0057* (2013.01); *H04B 1/707* (2013.01);
(Continued)

(58) Field of Classification Search
CPC .... H04B 1/0057; H04B 1/707; H04B 7/2634; H04L 29/12254; H04L 61/2038;
(Continued)

(56) References Cited

U.S. PATENT DOCUMENTS

| 8,767,570 B2 | 7/2014 | Ong et al. |
| 2008/0130519 A1* | 6/2008 | Bahl ............... H04L 12/2602 370/254 |

(Continued)

FOREIGN PATENT DOCUMENTS

WO    2013006988    1/2013

OTHER PUBLICATIONS

PCT International Application No. PCT/KR2015/010629, Written Opinion of the International Searching Authority dated Feb. 19, 2016, 4 pages.

*Primary Examiner* — Kashif Siddiqui
(74) *Attorney, Agent, or Firm* — Lee Hong Degerman Kang Waimey

(57) ABSTRACT

A communication method and device in an unlicensed band are provided. The device transmits a reservation signal for reserving a resource reservation period (RRP) which is to occupy a wireless channel for data transmission in an idle channel. The device transmits a data packet during the RRP.

10 Claims, 9 Drawing Sheets

(51) Int. Cl.
    *H04B 1/707*         (2011.01)
    *H04L 29/12*         (2006.01)
    *H04W 16/14*       (2009.01)
    *H04W 28/26*       (2009.01)
    *H04W 74/08*       (2009.01)

(52) U.S. Cl.
    CPC .... *H04L 29/12254* (2013.01); *H04L 61/2038* (2013.01); *H04W 16/14* (2013.01); *H04W 28/26* (2013.01); *H04W 74/08* (2013.01); *H04W 74/0816* (2013.01)

(58) Field of Classification Search
    CPC ..... H04W 16/14; H04W 28/26; H04W 74/08; H04W 74/0816
    See application file for complete search history.

(56) References Cited

U.S. PATENT DOCUMENTS

| | | | |
|---|---|---|---|
| 2012/0207036 A1* | 8/2012 | Ong | H04W 74/0816 370/252 |
| 2013/0329711 A1 | 12/2013 | Seo et al. | |
| 2014/0050203 A1 | 2/2014 | Doppler et al. | |
| 2014/0112289 A1 | 4/2014 | Kim et al. | |
| 2014/0378157 A1* | 12/2014 | Wei | H04W 16/14 455/454 |

\* cited by examiner

COMMUNICATION METHOD AND DEVICE IN UNLICENSED BAND

CROSS-REFERENCE TO RELATED APPLICATIONS

This application is the National Stage filing under 35 U.S.C. 371 of International Application No. PCT/KR2015/010629, filed on Oct. 7, 2015, which claims the benefit of U.S. Provisional Application No. 62/060,579, filed on Oct. 7, 2014, the contents of which are all hereby incorporated by reference herein in its entirety.

BACKGROUND OF THE INVENTION

Field of the Invention

The present invention relates to wireless communication, and more particularly, to a communication method in an unlicensed band in a wireless communication system, and an apparatus using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a communication method in an unlicensed band, and an apparatus using the method.

In an aspect, a method for communication in a wireless communication system includes confirming, by a wireless device, an idle channel in an unlicensed band, transmitting, by the wireless device, a reservation signal to reserve a resource reservation period (RRP) for occupying a wireless channel for data transmission in the idle channel, and transmitting, by the wireless device, a data packet during the RRP.

The RRP may start when a determined minimum time elapses after the reservation signal is transmitted.

The reservation signal may comprise information regarding a start point at which the RRP starts.

The reservation signal may comprise information regarding a duration of the RRP.

In another aspect, an apparatus in a wireless communication system includes a transceiver configured to transmit and receive a radio signal and a processor operatively coupled to the transceiver. The processor is configured to confirm, through the transceiver, an idle channel in an unlicensed band, transmit, through the transceiver, a reservation signal to reserve a resource reservation period (RRP) for occupying a wireless channel for data transmission in the idle channel, and transmit, through the transceiver, a data packet during the RRP.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
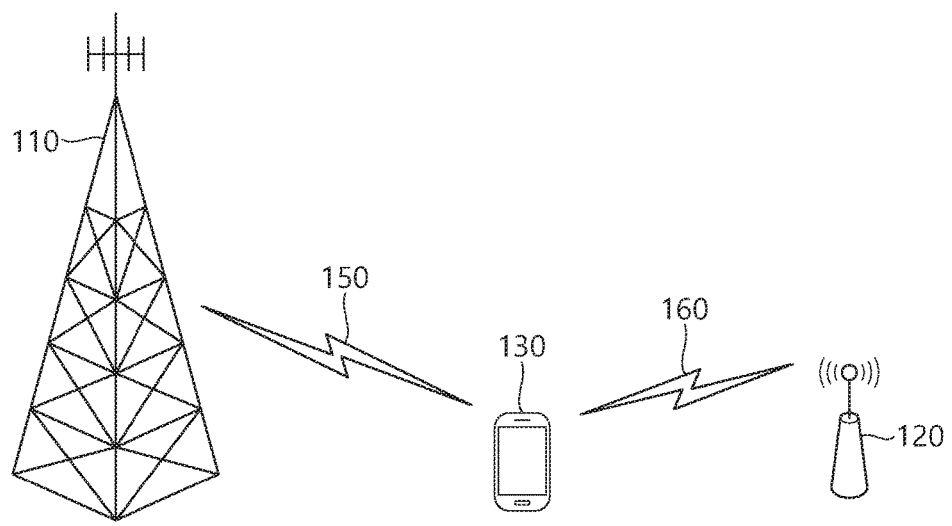
FIG. 1 shows an example of a long term evolution (LTE) service using an unlicensed band.

FIG. 1 shows an example of an LTE service using an unlicensed band.

A wireless device 130 establishes a connection with a $1^{st}$ BS 110, and receives a service through a licensed band. For traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Figure 2:
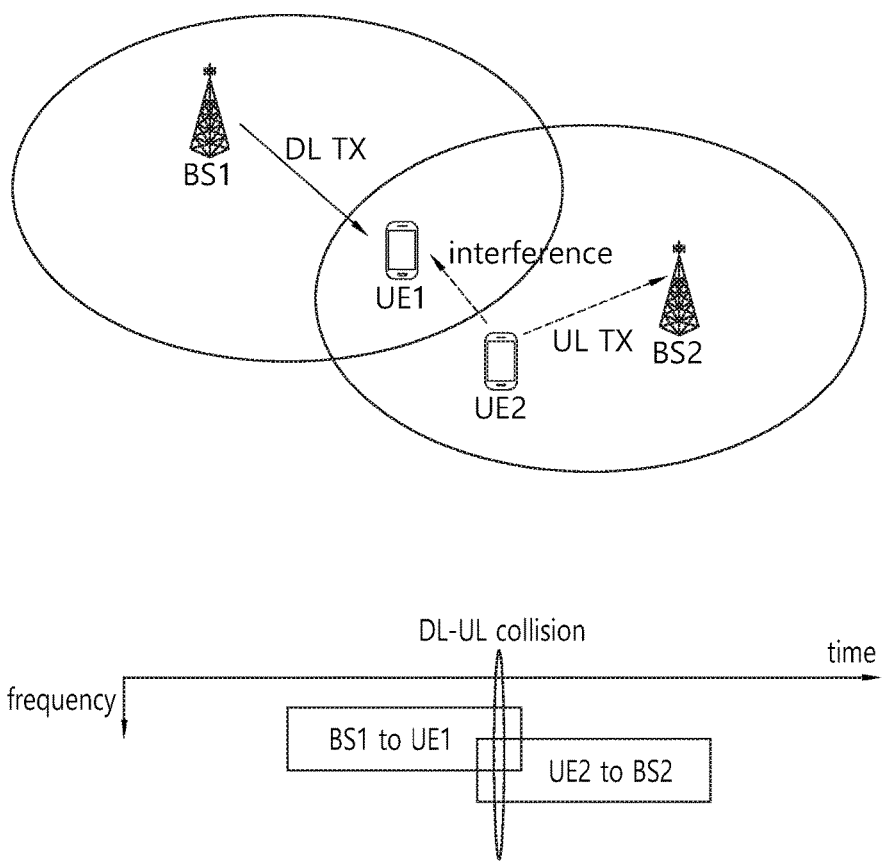
FIG. 2 shows an example of an interference in an unlicensed band.

FIG. 2 shows an example of interference in an unlicensed band.

A UE1 is operating in a first unlicensed band by accessing a BS1, and a UE2 is operating in a second unlicensed band by accessing a BS2. It shows that interference occurs due to transmission of different nodes (e.g., UE or BS), when the first and second unlicensed bands overlap partially or entirely.

The BS1 starts DL transmission to the UE1. Since the UE2 is located out of the coverage of the BS1, the UE2 may not be able to detect the DL transmission but be able to start UL transmission. If the UE1 and the UE2 are close to each other, UL transmission of the UE2 may act as interference to UL reception, and may deteriorate reception performance of the UE1.

Hereinafter, methods are proposed for avoiding communication performance deterioration caused by signal interference in an unlicensed band.

In the unlicensed band, transmission of a communication node may be achieved not persistently but intermittently due to fairness of a radio access with respect to other systems which exist in the same band. A time duration in which the communication node occupies a wireless channel to transmit data and/or receive data in the unlicensed band is referred to as a resource reservation period (RRP).

In general, if it is confirmed that a channel is busy, the communication node in the unlicensed band attempts the channel access again after a backoff time expires. Therefore, if backoff is repeated, a great delay may occur when the communication node transmits buffered data.

In addition, even if the communication node generates the RRP during a specific time to transmit/receive DL/UL data, there may be a duration generated in which no signal is transmitted in practice during the RRP or a duration in which a different communication node cannot recognize that a corresponding channel is in a busy state. The different communication node which recognizes the channel as an idle state may attempt a channel access during the RRP, which may act as an interference to signal transmission/reception of the communication node.

A method is proposed in which the communication node obtains the RRP and efficiently distinguishes the RRP between different communication nodes.

A reservation signal is a signal used by the communication node to reserve a duration of RRP. The reservation signal may include a preamble and a control signal. The control signal may include information regarding an RRP starting time and/or length.

First, the following time is defined.

Minimum time (Tmin): A minimum time to be ensured between the reservation signal and its corresponding RRP.

Start offset (Tdelta): An offset for starting the RRP corresponding to the reservation signal additionally at Tmin.

Maximum time (Tmax): A maximum time interval capable of starting the reservation signal and its corresponding RRP.

Waiting time (Twait): A time for confirming whether there is a reservation signal caused by another communication node before the reservation signal is transmitted.

The aforementioned times are not all necessary, and thus some of them may be omitted. Each time may be predetermined, or may be included in the reservation signal, or may be shared with each node through RRC signaling.

Figure 3:
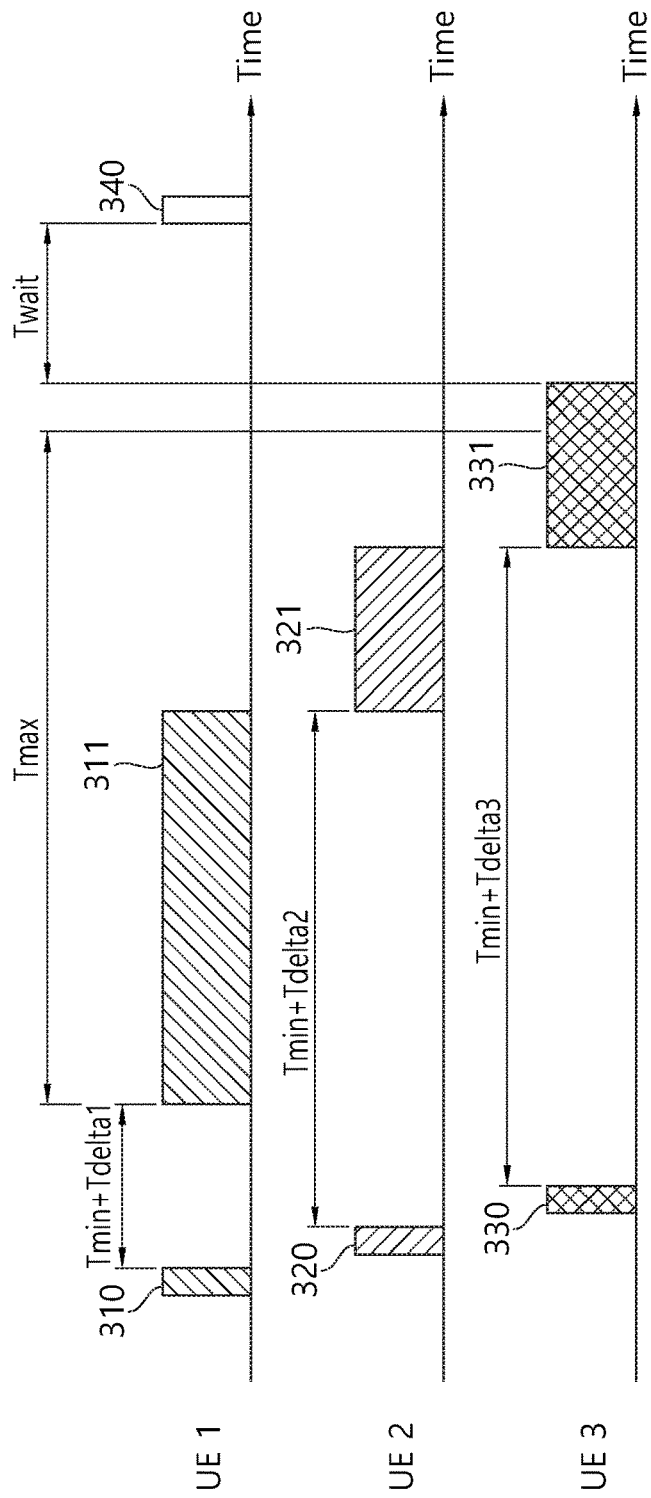
FIG. 3 shows a communication method according to an embodiment of the present invention.

FIG. 3 shows a communication method according to an embodiment of the present invention.

Upon confirming an idle channel by performing CCA, a UE1 transmits a first reservation signal 310. The first reservation signal 310 may be used to reserve a first RRP 311, and the UE1 may perform data packet reception or data packet transmission during the first RRP 311.

The first RRP 311 may start when Tmin+Tdelta1 elapses after the first reservation signal 310 is transmitted. If the first RRP 311 is a first RRP, Tdelta1 may be set to 0. The first reservation signal 310 may include information regarding at least any one of Tdelta1, a length of the first RRP 311, and Tmax.

Tmin is a time ensured so that the RRP can be reserved by another UE which requires an RRP reservation. Upon receiving the first reservation signal 310, a UE2 may know a start point and length of the first RRP 311, and if the RRP reservation is necessary, may transmit a second reservation signal 320. A second RRP 321 may start when Tmin+Tdelta2 elapses after the second reservation signal 320 is transmitted.

The UE2 may confirm the first reservation signal 310 transmitted by the UE1 before the second reservation signal 320 is transmitted, and may reserve the second RRP 321 at a time when the first RRP 311 ends in a range not exceeding Tmax.

Upon receiving the first RRP 310 and/or the second reservation signal 320, the UE may know a start point and length of the second RRP 321, and if the RRP reservation is necessary, may transmit a third reservation signal 330. A third RRP 331 may start when Tmin+Tdelta3 elapses after the third reservation signal 330 is transmitted.

The UE3 may reserve the third RRP 331 at a time when the second RRP 321 ends in a range not exceeding Tmax. If an RRP desired by the UE starts after Tmax, the UE may discard or delay the RRP reservation.

Thereafter, the UE1 which desires a different RRP reservation confirms whether there is a reservation signal previously transmitted by another UE for a reservation during the waiting time Twait. In addition, if the reservation signal is not detected, the UE1 may transmit an additional reservation signal 340.

Figure 4:
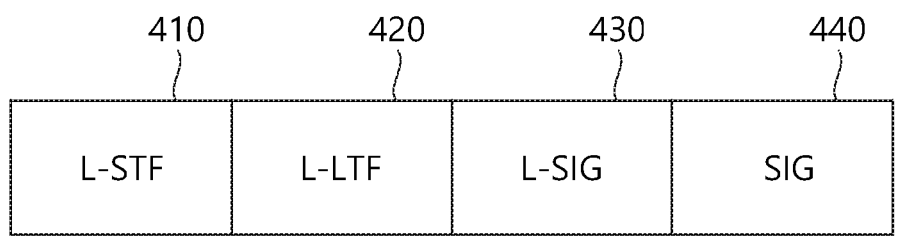
FIG. 4 shows a configuration of a reservation signal according to an embodiment of the present invention.

FIG. 4 shows a configuration of a reservation signal according to an embodiment of the present invention.

The reservation signal may have a form of a physical layer protocol data unit (PPDU), and may include a legacy short training field (L-STF) 410, a legacy long training field (L-LTF) 420, a legacy signal field (L-SIG) 430, and a signal field (SIG) 440.

The L-STF 410 may be utilized in carrier sensing for detecting that a signal exists in a channel currently in use, automatic gain control for adjusting a radio signal which is input to an antenna to an operating area of an analog circuit and an analog-to-digital converter, and coarse carrier frequency offset correction.

The L-LTF 420 may be used for fine carrier frequency offset correction and symbol synchronization, and may be used for channel response estimation for demodulation of the L-SIG 430.

The L-SIG 430 is generated as a bit sequence having information indicating a length of a corresponding PPDU or a transmission time of the corresponding PPDU.

Next to the L-SIG 430, the SIG 440 having information necessary for a reservation of the RRP is transmitted. The SIG 440 may include information regarding at least one of Tmax, a length of the RRP, a start offset of the RRP, and a channel to which the RRP is assigned.

Figure 5:
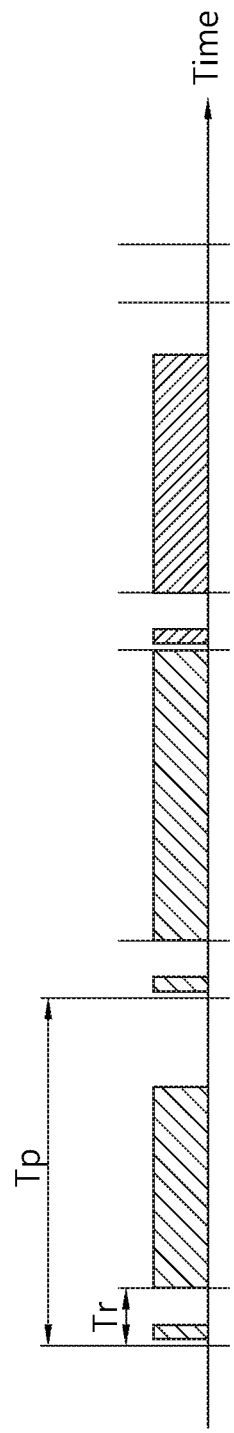
FIG. 5 shows a communication method according to another embodiment of the present invention.

FIG. 5 shows a communication method according to another embodiment of the present invention.

The following time is defined.

Reservation period (Tp): A time in which a reservation signal and its corresponding RRP can be defined.

Reservation slot (Tr): A duration in which a reservation signal can be transmitted for each reservation period.

Tp and Tr may be predetermined, or may be shared with each UE through RRC signaling.

Tr is defined commonly between UEs to transmit or receive a reservation signal. In addition, Tr is defined for each reservation period Tp. A UE which has data to be transmitted may reserve the RRP by transmitting the reservation signal in the reservation slot.

In one reservation slot, one UE may transmit one reservation signal. A UE capable of transmitting the reservation signal in each reservation slot may be predetermined or may be reported by a BS. Alternatively, the UE may transmit the reservation signal through CCA contention in the reservation slot.

Figure 6:
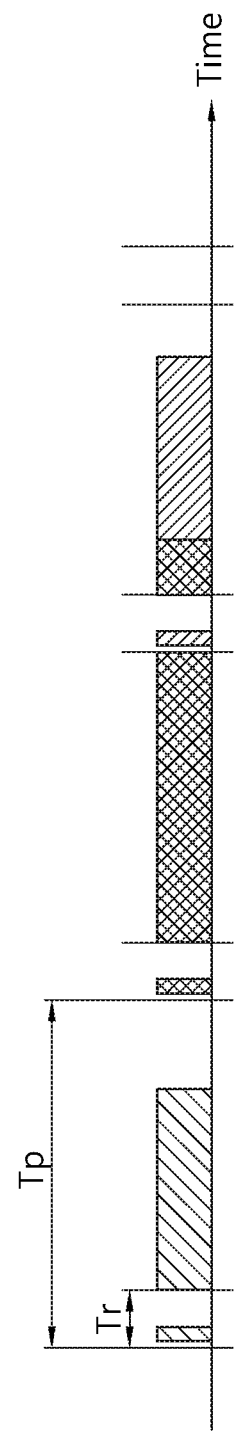
FIG. 6 shows a communication method according to another embodiment of the present invention.

FIG. 6 shows a communication method according to another embodiment of the present invention.

In comparison with the embodiment of FIG. 5, one RRP is configured over a plurality of reservation periods.

The reservation signal may include information regarding the reservation period in which the RRP is configured. Alternatively, if a length of the RRP exceeds a current reservation period, it may be regarded that the RRP is extended until a next reservation period.

Figure 7:
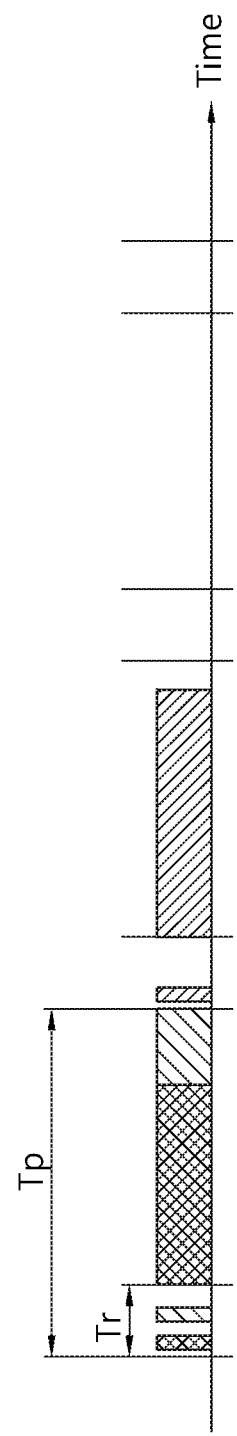
FIG. 7 shows a communication method according to another embodiment of the present invention.

FIG. 7 shows a communication method according to another embodiment of the present invention.

A plurality of reservation signals may be transmitted in one reservation slot. A UE capable of transmitting the reservation signal in each reservation slot may be predetermined or may be reported by a BS. Alternatively, the UE may transmit the plurality of reservation signals through CCA contention in the reservation slot.

Figure 8:
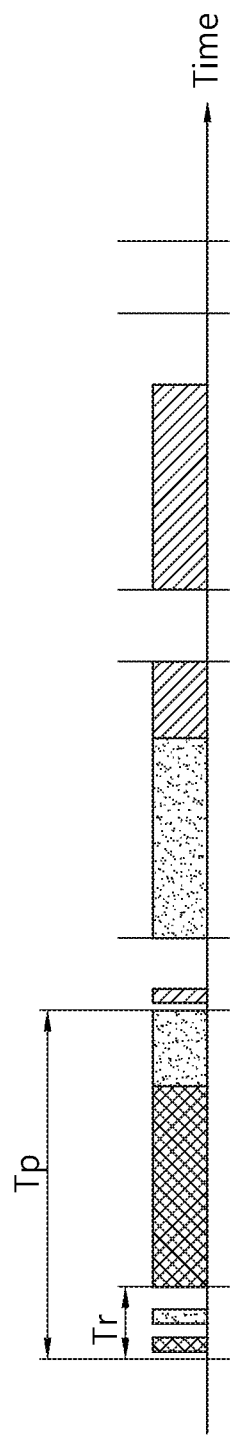
FIG. 8 shows a communication method according to another embodiment of the present invention.

FIG. 8 shows a communication method according to another embodiment of the present invention.

In comparison with the embodiment of FIG. 7, one RRP is configured over a plurality of reservation periods.

Similarly to the embodiment of FIG. 6 or FIG. 8, if the RRP is configured over the plurality of reservation periods, a UE which has reserved the RRP stops its data reception/transmission in a defined reservation slot during the RRP.

It is assumed that a first UE reserves a first RRP through a first reservation signal. A second UE which has received the first reservation signal may reserve an RRP for the second UE after the first RRP. It may be possible to apply Tmax as a maximum interval between the reservation signal and its corresponding RRP and Twait for confirming whether there is a reservation signal caused by another UE before the reservation signal is transmitted.

Figure 9:
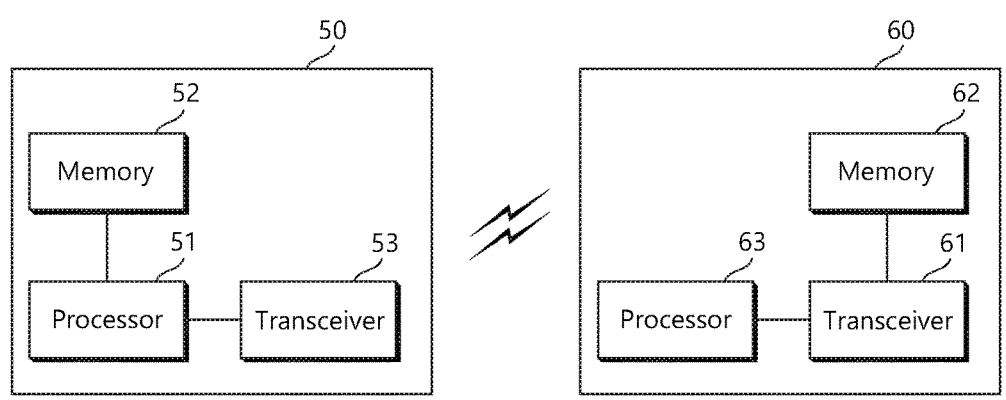
FIG. 9 is a block diagram showing a wireless communication system according to an embodiment of the present invention.

FIG. 9 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a data packet in a wireless communication system, the method comprising:
    confirming, by a first wireless device, an idle channel in an unlicensed band;
    transmitting, by the first wireless device, a first reservation signal to reserve a first resource reservation period (RRP) for occupying a wireless channel for data transmission in the idle channel; and
    transmitting, by the first wireless device, the data packet during the first RRP,
    wherein the first RRP starts when a non-zero minimum time duration elapses after the first reservation signal is transmitted and ends at a predetermined maximum time,
    wherein a second reservation signal is transmitted by a second wireless device to reserve a second RRP during the minimum time duration,
    wherein the second wireless device coexists with the first wireless device in the unlicensed band, and
    wherein the second RRP starts at a time when the first RRP ends and ends within the predetermined maximum time.

2. The method of claim 1, wherein the first reservation signal comprises information regarding when the non-zero minimum time duration elapses after the first reservation signal is transmitted.

3. The method of claim 1, wherein the first reservation signal comprises information regarding a duration of the first RRP.

4. The method of claim 1, wherein the first reservation signal comprises information regarding the predetermined maximum time.

5. The method of claim 1, further comprising:
    confirming, by the first wireless device, that a third reservation signal caused by a third wireless device is not detected during a waiting time, and then transmitting an additional reservation signal to reserve an additional RRP.

6. The method of claim 1, further comprising:
    establishing, by the first wireless device, a connection with a primary cell operating in a licensed band; and
    activating, by the first wireless device, a secondary cell operating in the unlicensed band by an indication of the primary cell.

7. A first wireless device for transmitting a data packet in a wireless communication system, the first wireless device comprising:
    a transceiver configured to transmit and receive a radio signal; and
    a processor operatively coupled to the transceiver and configured to:
        confirm an idle channel in an unlicensed band;
        transmit a first reservation signal to reserve a first resource reservation period (RRP) for occupying a wireless channel for data transmission in the idle channel; and
        transmit the data packet during the first RRP,
        wherein the first RRP starts when a non-zero minimum time duration elapses after the first reservation signal is transmitted and ends at a predetermined maximum time, wherein a second reservation signal is transmitted by a second wireless device to reserve a second RRP during the minimum time duration, wherein the second wireless device coexists with the first wireless device in the unlicensed band, and wherein the second RRP starts at a time when the first RRP ends and ends within the predetermined maximum time.

8. The first wireless device of claim 7, wherein the first reservation signal comprises information regarding when the non-zero minimum time duration elapses after the first reservation signal is transmitted.

9. The first wireless device of claim 7, wherein the first reservation signal comprises information regarding a duration of the first RRP.

10. The first wireless device of claim 7, wherein the first reservation signal comprises information regarding the predetermined maximum time.

* * * * *